US005137438A

United States Patent [19]

Miller

[11] Patent Number: 5,137,438

[45] Date of Patent: Aug. 11, 1992

[54] MULTIPLE SPEED FLUID MOTOR

[75] Inventor: Laurence L. Miller, W. Lafayette, Ind.

[73] Assignee: TRW Inc., Lyndhurst, Ohio

[21] Appl. No.: 687,287

[22] Filed: Apr. 18, 1991

[51] Int. Cl.[5] .......... F01C 1/10; F03C 2/08; F16K 3/24; F16K 27/04

[52] U.S. Cl. .......... 418/61.3; 251/367

[58] Field of Search .......... 418/61.3; 251/367; 91/366, 458, 519

[56] References Cited

U.S. PATENT DOCUMENTS

| | | | |
|---|---|---|---|
| 3,288,034 | 11/1966 | White, Jr. et al. | 418/61.3 |
| 3,371,682 | 3/1968 | Flint | 251/367 |
| 3,586,466 | 6/1971 | Erickson | 418/80 |
| 3,778,198 | 12/1973 | Giverson | 418/61.3 |
| 3,892,503 | 7/1975 | Getman | 418/61.3 |
| 4,232,708 | 11/1980 | Miller | 418/61.3 |
| 4,480,971 | 11/1984 | Swedberg | 418/61.3 |
| 4,493,622 | 1/1985 | Miller | 418/61.3 |
| 4,697,997 | 10/1987 | White, Jr. | 418/61.3 |
| 4,715,798 | 12/1987 | Bernstrom | 418/61.3 |

OTHER PUBLICATIONS

Char-Lynn Brochure No. 10-107, Sep. 1989 "2000 Series Two Speed Motor".

Hydraulic & Pneumatics Magazine, Nov. 1990, pp. 8 and 10.

*Primary Examiner*—John J. Vrablik

*Attorney, Agent, or Firm*—Tarolli, Sundheim & Covell

[57] ABSTRACT

A multiple speed fluid motor includes a housing having an inlet port for receiving high pressure fluid and an exhaust port for exhausting low pressure fluid, and a gerotor gear set. An output shaft is supported for rotation relative to the housing. One of the gerotor gears is coupled with the output shaft for rotating the output shaft in response to fluid being supplied to the inlet port. The motor includes fluid passages for conducting fluid to the fluid displacement means. A control valve member is movable to control fluid flow through the fluid passages to control the rotational speed of the output shaft. The control valve member is mounted in a valve chamber defined by a plurality of plates.

18 Claims, 7 Drawing Sheets

MULTIPLE SPEED FLUID MOTOR

BACKGROUND OF THE INVENTION

1. Technical Field

The present invention relates to a multiple speed fluid displacement apparatus, and more particularly, to a multiple speed fluid motor.

2. Description of the Prior Art

Multiple speed fluid motors are known. U.S. Pat. No. 3,778,198 discloses a typical two-speed hydraulic gerotor motor which uses a rotary slide valve to switch the motor between a high speed, low torque mode, and a low speed, high torque mode.

SUMMARY OF THE INVENTION

The present invention is a fluid motor comprising a housing having an inlet port for receiving high pressure fluid and an exhaust port for exhausting low pressure fluid. An output shaft is supported for rotation relative to the housing. Fluid displacement means is in the housing for rotating the output shaft in response to fluid pressure being applied to the fluid displacement means. Fluid passages conduct fluid from the inlet port to the fluid displacement means and from the fluid displacement means to the exhaust port.

A control valve member is movable to control fluid flow through the fluid passages in the motor. The control valve member is mounted in a valve chamber defined by a plurality of planar plates having portions of the fluid passages extending therethrough. The planar plates are parallel and stacked together in sealing engagement. Adjoining portions of fluid passages in adjoining plates register to provide fluid communication through the adjoining plates to form the fluid passages. The valve member is movable in the valve chamber in a direction parallel to the plane of the plates. Movement of the valve member between first and second positions controls the rotational speed of the output shaft.

BRIEF DESCRIPTION OF THE DRAWINGS

The foregoing and other features of the present invention will become apparent to one skilled in the art upon a consideration of the following description of the invention with reference to the accompanying drawings, wherein.

DESCRIPTION OF PREFERRED EMBODIMENTS OF THE INVENTION

Figure 1:
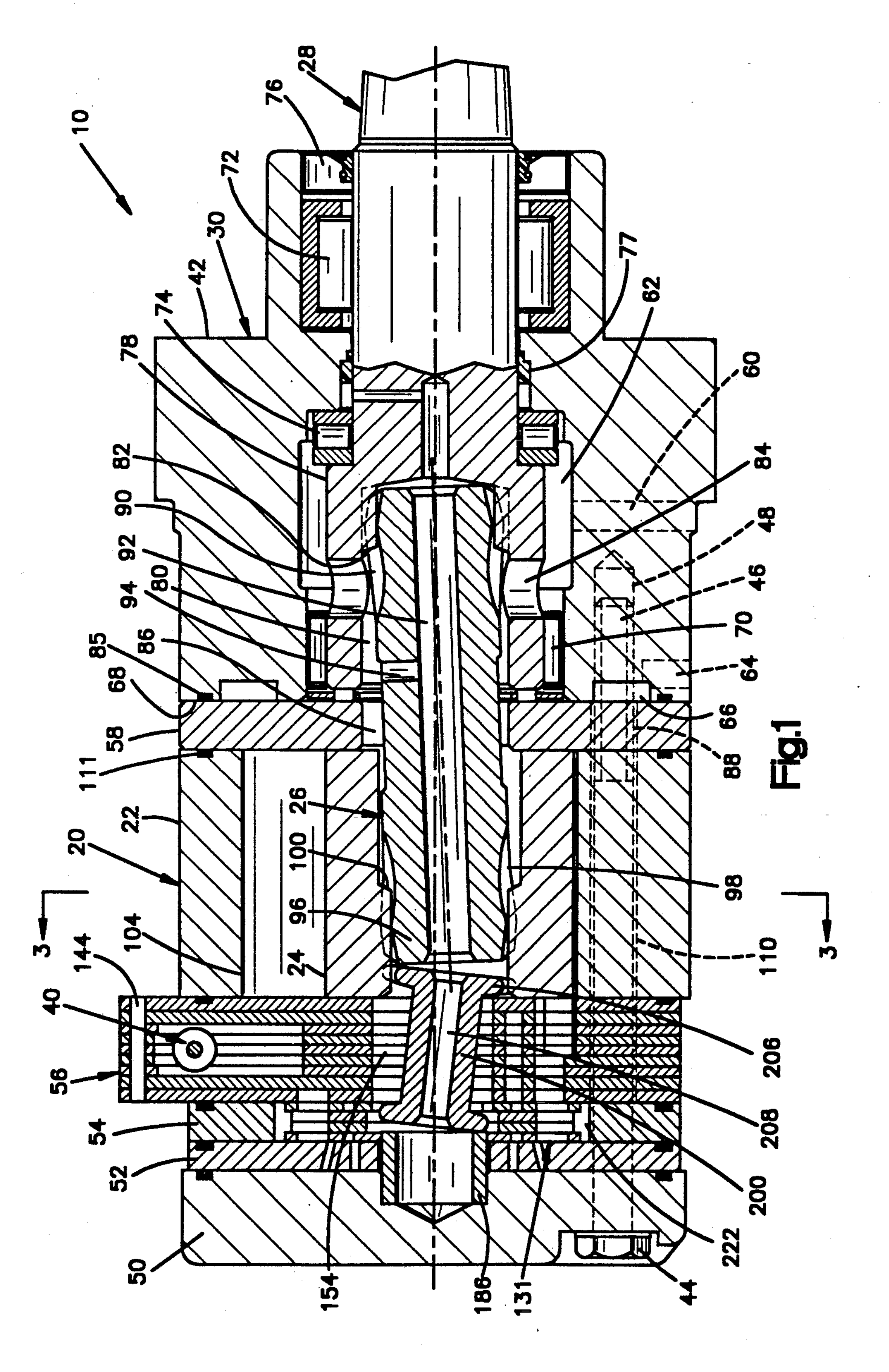
FIG. 1 is a longitudinal sectional view of a hydraulic motor constructed in accordance with the present invention.

The present invention relates to a fluid displacement apparatus and particularly to a multiple speed fluid motor. The present invention is applicable to various fluid motor constructions. As a representative embodiment of the present invention, FIG. 1 illustrates a multiple speed hydraulic motor 10. The motor 10 is supplied with fluid under pressure from a fixed displacement pump (not shown) to operate the motor.

The motor 10 includes a gerotor gear set 20 which may be of a known construction. The gear set 20 includes a stator 22, preferably made from a ductile iron casting, and a rotor 24 preferably made from SAE 8620 and heat treated. When hydraulic fluid is supplied to the gear set 20, the rotor 24 rotates and orbits relative to the stator 22. The rotor 24 is drivingly connected to a wobble shaft 26 preferably made from SAE 8620 and heat treated, and the wobble shaft 26 is drivingly connected to an output shaft 28 preferably made from SAE 8620 and heat treated which extends from a motor housing 30. Rotation of the rotor 24 results in rotation of the output shaft 28. In accordance with the present invention, the rotational speed of the valve 40 preferably made from SAE 12L14 and heat treated, in a manner described hereinafter.

The motor housing 30, preferably made from a ductile iron casting, includes a housing body 42. Seven mounting bolts 44 (only one of which is shown in FIG. 1) are threaded into the housing body 42. The mounting bolts 44 are located near the outer diameter of the motor 10. The threaded end 46 of each bolt 44 is received in a threaded hole 48 in the housing body 42. The mounting bolts 44 secure an end cap 50, a pressure balancing plate 52, a commutator ring 54, a manifold 56, the stator 22, and a wear plate 58 to the housing body 42.

A fluid inlet port 60 extends radially through the housing body 42 to a chamber 62. A fluid outlet port 64 extend through the main housing body 42 and communicates with a annular groove 66 on an axial end face 68 of the housing body 42.

The output shaft 28 is journalled for rotation in the housing body 42 by bearings 70 and 72 and a thrust bearing 74. A dirt and water seal assembly 76 retains grease and excludes dirt and water from entering the motor. A shaft seal assembly 77 provides a high pressure seal which blocks leakage of fluid between the output shaft 28 and the housing body 42. An annular wall 78 of the output shaft 28 defines a hollow end chamber 80 within the output shaft 28. A series of longitudinally extending splines 82 are on the interior of the wall 78. A radial passage 84 extends through the wall 78 of the output shaft 28. The passage 84 establishes fluid communication between the chamber 62 in the housing body 42 and the chamber 80 in the output shaft 28.

The wear plate 58 is in abutting engagement with an axial end face 68 of the housing body 42 A seal 85 is provided to block leakage of fluid between the housing body 42 and the wear plate 58. The wear plate 58 has a central opening 86. The mounting bolts 44 extend axially through bolt holes 88 in the wear plate 58. The bolt holes 88 are in fluid communication with the annular groove 66 in the housing body 42. The bolt holes 88 are larger than the mounting bolts 44 where the mounting bolts 44 extend through the bolt holes 88. Accordingly, fluid can flow axially through the bolt holes 88 around the bolts 44.

The wobble shaft 26 has a splined connection with the output shaft 28. Longitudinally extending splines 90 on the wobble shaft 26 engage the longitudinally extending splines 82 on the interior of the wall 78 of the output shaft 28. The wobble shaft 26 extends through the central opening 86 of the wear plate 58. Fluid can flow through the central opening 86 of the wear plate 58 around the outside of the wobble shaft 26.

Figure 3:
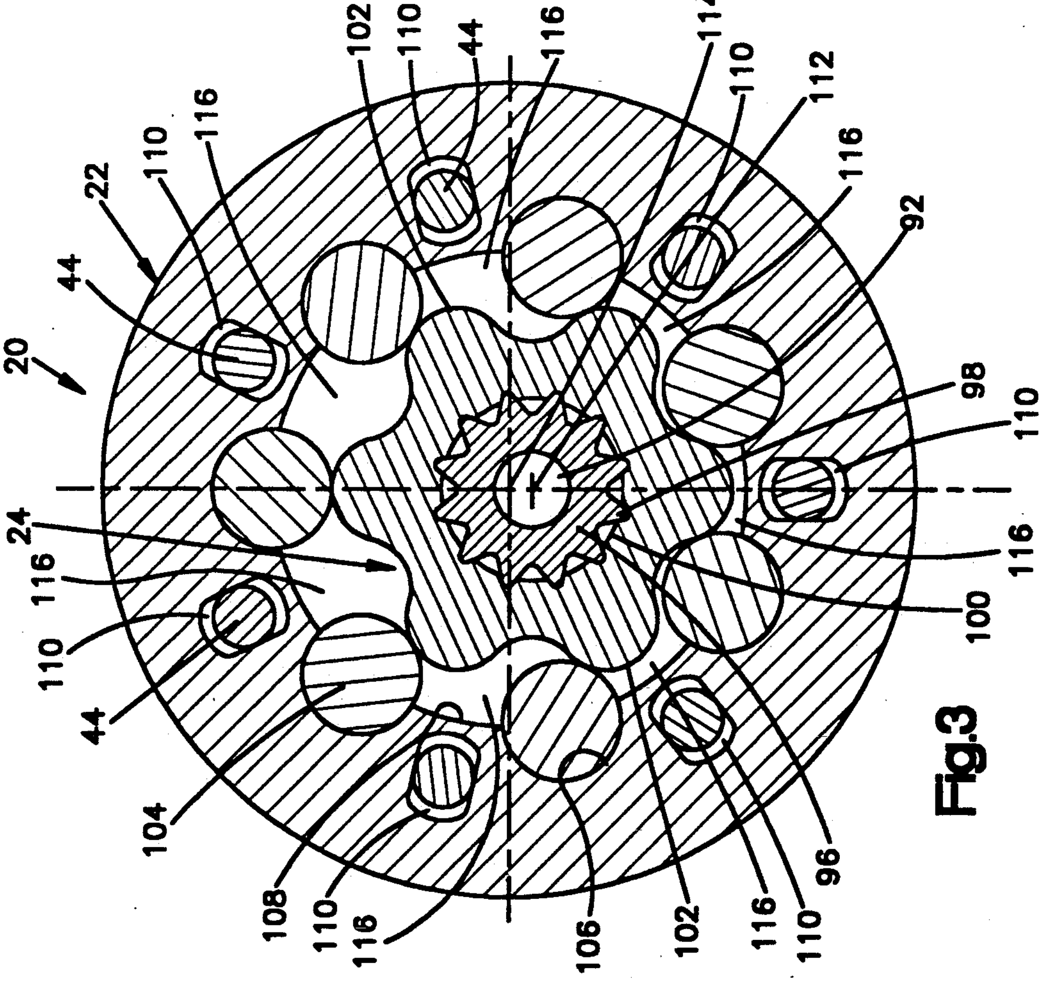
FIG. 3 is a transverse sectional view through the gear set of the motor of FIG. 1, taken along line 3—3 of FIG. 1.

A central passage 92 extends longitudinally through the wobble shaft 26. A radial passage 94 establishes fluid communication between the hollow end chamber 80 in the output shaft 28 and the central passage 92 in the wobble shaft 26. Thus, the fluid inlet port 60, the chamber 62, the radial passage 84 in the output shaft 28, the chamber 80 in the output shaft 28, the passage 94 in the wobble shaft 26, and the passage 92 in the wobble shaft 26, are all in fluid communication. The end 96 of the wobble shaft which is opposite from the output shaft 28 has a splined connection with the rotor 24 of the gerotor gear set 20. Specifically, external splines 98 (FIG. 3) on the wobble shaft 26 engage internal splines 100 on the rotor 24.

The rotor 24 has six lobes 102. The rotor lobes 102 engage seven roller vanes 104 of the stator 22. The roller vanes 104 are received in axially extending recesses 106 in the inner circumferential surface 108 of the stator 22. The gear set 20 is of a known construction.

The mounting bolts 44 extend through bolt holes 110 in the stator 22 and into the wear plate 58. A seal 111 is provided to block leakage of fluid between the stator 22 and the wear plate 58. Each bolt hole 110 is aligned with and in fluid communication with one of the bolt holes 88 in the wear plate 58. Each bolt hole 110 is large enough so that fluid can flow through the bolt hole 110 around the bolt 44 extending through the hole.

The rotor 24 orbits and rotates relative to the stator 22. The rotor 24 rotates around a rotational axis 112 and orbits around an orbit axis 114. Seven pockets 116 are formed between the lobes 102 of the rotor 24 and the roller vanes 104 of the stator 22. Upon introduction of fluid under pressure into the pockets 116, the rotor 24 orbits and rotates, and each pocket 116 alternately expands and contracts, in a known manner. As the rotor 24 rotates, it rotates the wobble shaft 26 which rotates the output shaft 28.

The fluid manifold 56 (FIG. 2) is in abutting engagement with an axial end face 118 of the stator 22. The manifold 56 in a preferred embodiment includes nine manifold plates. A group of five control plates 120 is disposed in the axial center of the manifold 56. The control plates 120 are disposed parallel to each other in a stacked relationship. Two outer manifold plates are disposed on either side of the group of control plates 120. The outer manifold plates include a plate 122 at the left end of the manifold 56 as viewed in FIG. 2, an adjacent plate 124, and two plates 126 and 128 at the right end of the manifold 56 as viewed in FIG. 2. A seal 129 is provided to block leakage of fluid between the stator 22 and the plate 128.

Each of the nine manifold plates is a metal stamping. Preferably, each plate is stamped from AISI 1018 silicon killed low carbon steel which is heat treated. The nine manifold plates are stacked together in abutting engagement, and then copper brazed together, to form the manifold 56. The copper brazing is such that fluid leakage between the plates is blocked.

The four outer manifold plates 122, 124, 126, and 128 are not all identical. However, they are similar enough so that, for the purposes of this invention, only the plate 122 need be described since it is illustrative. The plate 122 (FIG. 5) includes a circular portion 124 and a rectangular extension 126 which projects from the portion 124. A circular central opening 128 extends through the circular portion 124 of the plate 122. A ring-shaped opening 130 is located radially outwardly of the central opening 128. The ring-shaped opening 130 extends circumferentially around most of the center opening 128.

Figure 5:
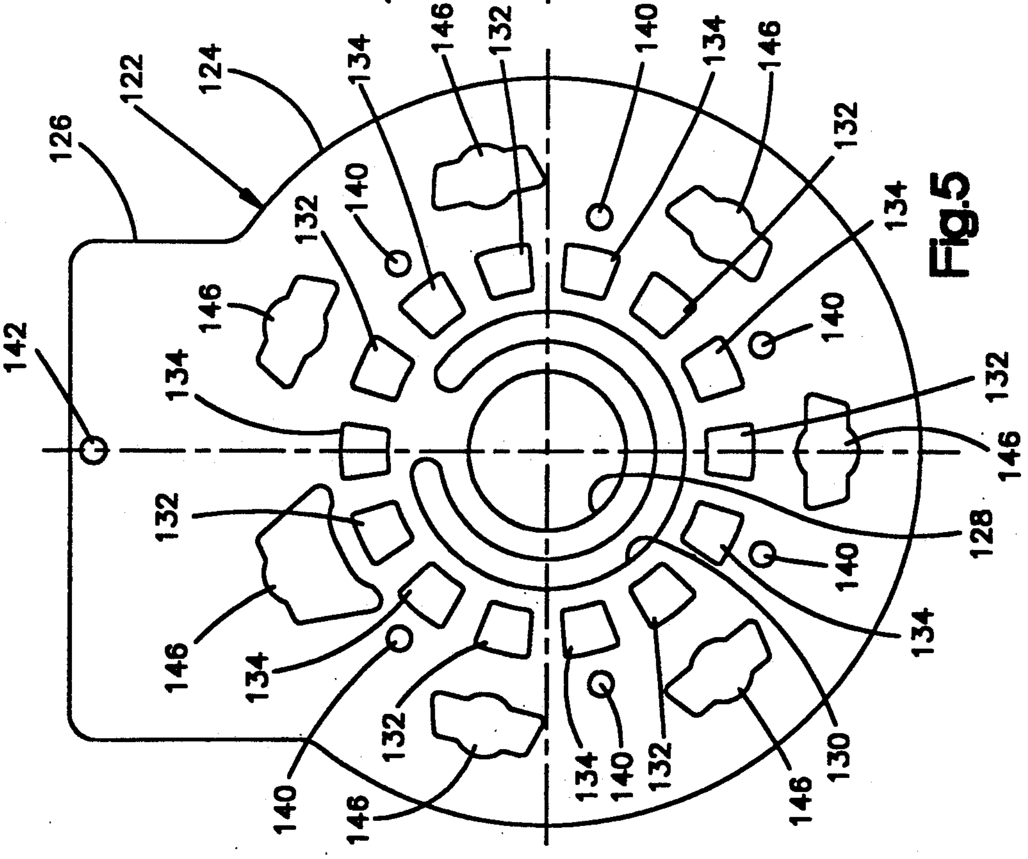
FIG. 5 is an elevational view of an outer manifold plate of the motor of FIG. 1, as viewed in the direction of line 5—5 of FIG. 2.

A series of fourteen windows 132 and 134 are circumferentially spaced around the ring opening 130. All fourteen windows 132 and 134 extend axially completely through the plate 124. Seven of the windows designated 132 align with similar windows in the next adjacent plate 124 to form fluid passages extending through the plates 122 and 124 to the control plates 120. The other seven windows designated 134 in FIG. 5 are dead-ended against the plate 124, meaning that the plate 124 has no opening at those locations. The windows designated 134 are provided for pressure balancing purposes.

The plate 122 has six circumferentially spaced pin openings 140 for receiving pins to locate the plates of the manifold 166 relative to each other prior to their being brazed together to form the manifold 56. Another pin opening 142 in the rectangular area 126 receives a similar locator pin 144 which can be seen in FIG. 2. The rectangular area 126 of the plate 122 is otherwise free of openings. Seven bolt holes 146 extend axially through the plate 122. Each bolt hole 146 is large enough to receive a mounting bolt 44 while leaving space around the bolt 144 for fluid to pass through the bolt hole 146.

Figure 2:
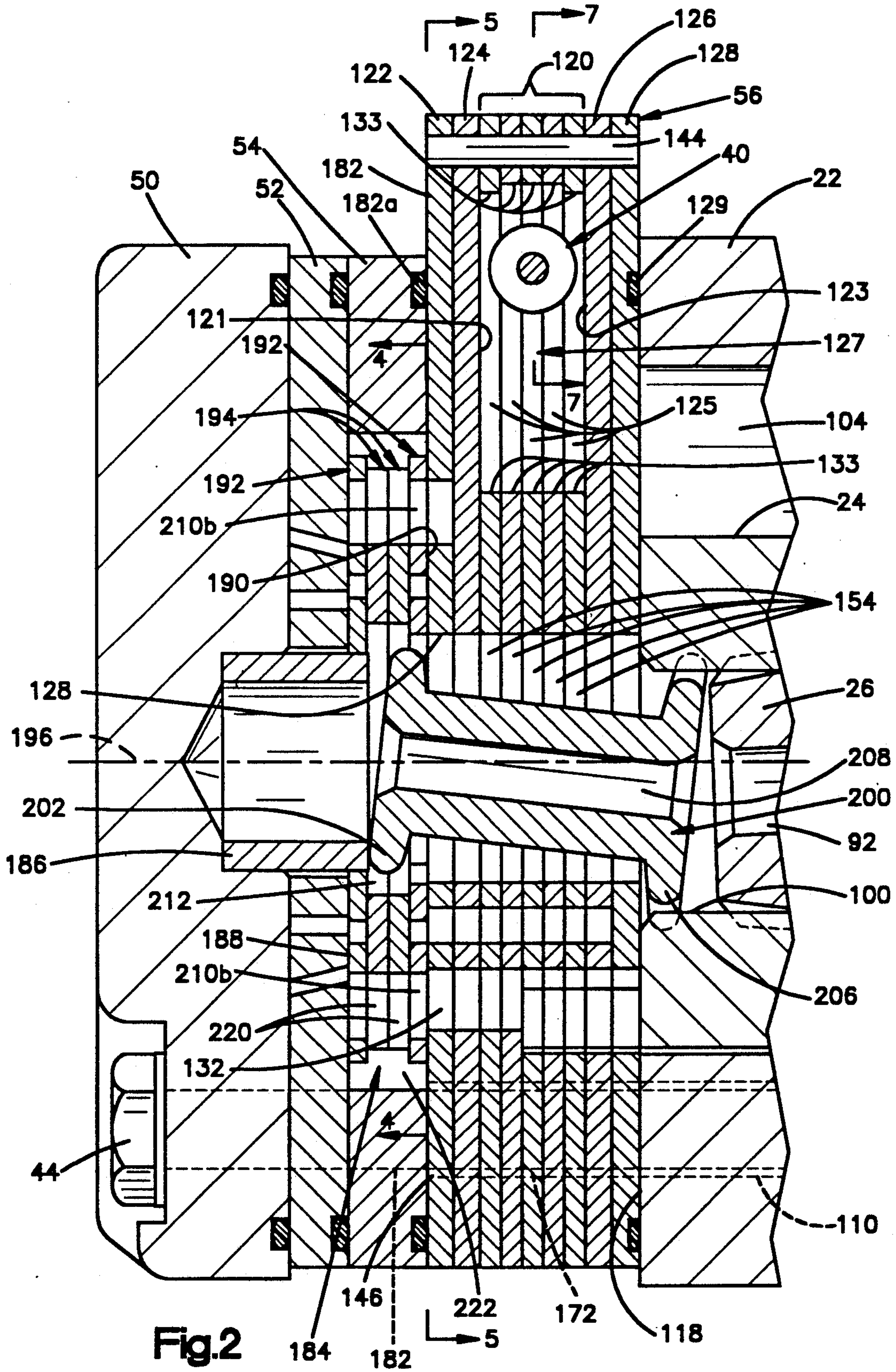
FIG. 2 is an enlarged view of a portion of FIG. 1.

The outer manifold plates 126 and 128 at the right axial end of the manifold 56, as viewed in FIG. 2, are similar to the plate 122, but have only seven circumferentially spaced windows extending therethrough, rather than fourteen. The seven windows in the manifold plates 126 and 128 are aligned circumferentially with the seven active windows 132 in the plate 122.

As shown in FIG. 2, the plate 124 defines one axial side 121 of a valve chamber 127 and the plate 126 defines the opposite axial side 123 of the valve chamber 127. The plates 120 are intermediate plates located between the plate 124 and the plate 126. The plates 20 have aligned openings 125 and edge portions 133 defining the aligned openings 125 extending transverse to major surfaces of the plates 20. The aligned openings 125 form the valve chamber 127 and the edge portions 133 of the plates 20 comprise a boundary of the valve chamber 127.

The five control plates 120, although not all identical in construction, are similar enough that for purposes of the present invention, only one plate 120 need be described herein. The plate 120 (FIG. 6) has a circular portion 150 and a rectangular valve area 152 projecting from the portion 150. A circular central opening 154 extends through the circular portion 150 of the plate 120.

A control passage 156 extends radially outwardly from the central opening 154 into the valve area 152. The control passage 156 establishes fluid communication between the open center of the control plate 120 and the valve area 152.

Figure 6:
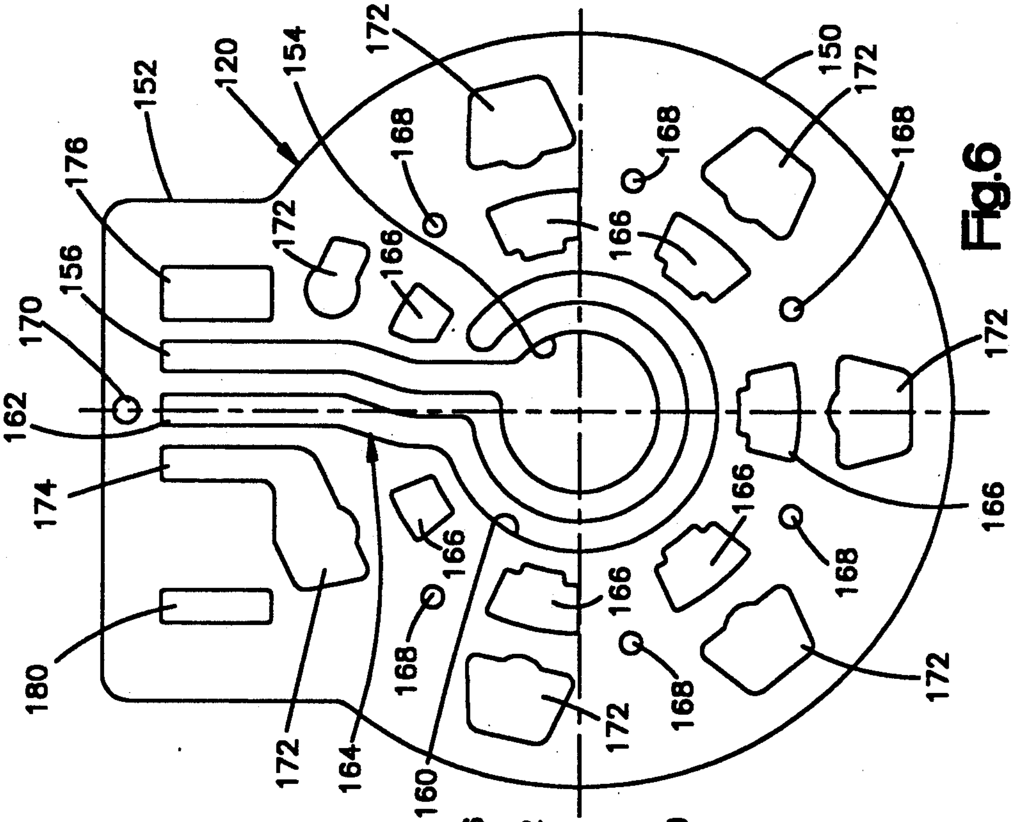
FIG. 6 is an elevational view of a control plate of the manifold of the motor of FIG. 1 prior to assembly in the hydraulic motor.

A ring-shaped opening 160 extends circumferentially around most of the central opening 154. The opening 160 is aligned with and in fluid communication with the opening 130 in the outer manifold plate 122. A common control passage 162 extends radially outwardly from the opening 160 into the valve area 152 of the plate 120. As can be seen in FIG. 6, the opening 160 and the common control passage 162 together form a fluid passage 164 in the shape of an upside down question mark.

Seven windows 166 are spaced circumferentially around the ring opening 160. The seven windows 166 align with the seven active windows 132 in the outer manifold plate 122 (FIG. 5). The windows 166 extend axially through the plate 120, permitting fluid to flow axially through the assembled control plates 120 from on axial end of the manifold 56 to the other. The control plate 120 also has six circumferentially spaced pin openings 168 and an upper pin opening 170 for receiving the locator pins used in assembly of the manifold 56.

Seven bolt holes 172 extend axially through the control plate 120. Each bolt hole 172 is large enough to receive a mounting bolt 44 while leaving space around the bolt 44 for fluid to pass through the bolt hole. The bolt holes 172 in the control plate 120 are aligned with the bolt holes 146 in the outer manifold plate 124 and also with the bolt holes 110 in the stator 22. Thus, fluid can flow axially through the entire manifold 56 between the commutator ring 54 and the stator 22.

A control passage 174 extends radially from one of the bolt holes 172 into the valve area 152 of the control plate 120. The control passage 174 establishes fluid communication between a bolt hole 172 on the outer area of the motor 10, and the valve area 152.

The control plate 120 has a pilot pressure opening 176 for communicating an external pilot fluid pressure from a pilot passage 178 (FIG. 7) to the control valve 40. The control plate 120 also has an atmospheric pressure opening 180 for communicating atmospheric pressure to a portion of the control valve 40, in a manner to be described hereinafter.

The outer axial end face 182 of the manifold 56 is in abutting engagement with the commutator ring 54 (FIG. 2). A seal 182*a* is provided to block leakage of fluid between the manifold 56 and commutator ring 54. Seven bolt holes 183 extend axially through the commutator ring 54. The mounting bolts 44 extend through the bolt holes 183.

A commutator 184 is journalled for rotation within the commutator ring 54 on a drive link spacer 186. The drive link spacer 186 is a tubular part mounted in the end cap 50. The drive link spacer 186 extends through an opening in the pressure balance plate 52. The outer axial end face 188 of the commutator 184 rotates against the pressure balance plate 52. The inner axial end face 190 of the commutator 184 rotates against the outer manifold plate 122. The commutator 184, as it rotates, commutates against the outer manifold plate 122 to control fluid flow between the inlet port 60, the gear set 20, and the exhaust port 64.

The commutator 184 (FIG. 2) rotates within the commutator ring 54 about a fixed axis of rotation 196. The commutator 184 does not orbit. The commutator 184 is rotated by a drive link 200 which has a splined connection to the inside of the commutator 184. External splines 202 on the drive link 200 engage in recesses 204 (FIG. 4) on the inner diameter of the commutator 184. The drive link 200 is itself driven through a splined connection to the rotor 24, in which external splines 206 on the drive link 200 engage the internal splines 100 on the rotor 24. Thus, rotation of the rotor 24 causes the commutator 184 to rotate at the speed of rotation of the rotor 24. The drive link 200 has a axially extending central opening 208 for transmitting fluid therethrough.

The commutator 184 is a group of four commutator plates which are brazed together in a fluid tight engagement and heat treated. The two outer commutator plates 192 are similar and illustrated in FIG. 4. The two inner plates 194 (not illustrated in detail) are configured differently from the outer commutator plates 192. The inner plates 194 have a series of radially extending passages therein which communicate with windows on the outer plates 192 and with the interior and exterior of the commutator 184. These radially extending passages are shown in dashed lines in FIG. 4. Because this aspect of the commutator construction is well known, the inner plates 194 are not illustrated in further detail.

Figure 4:
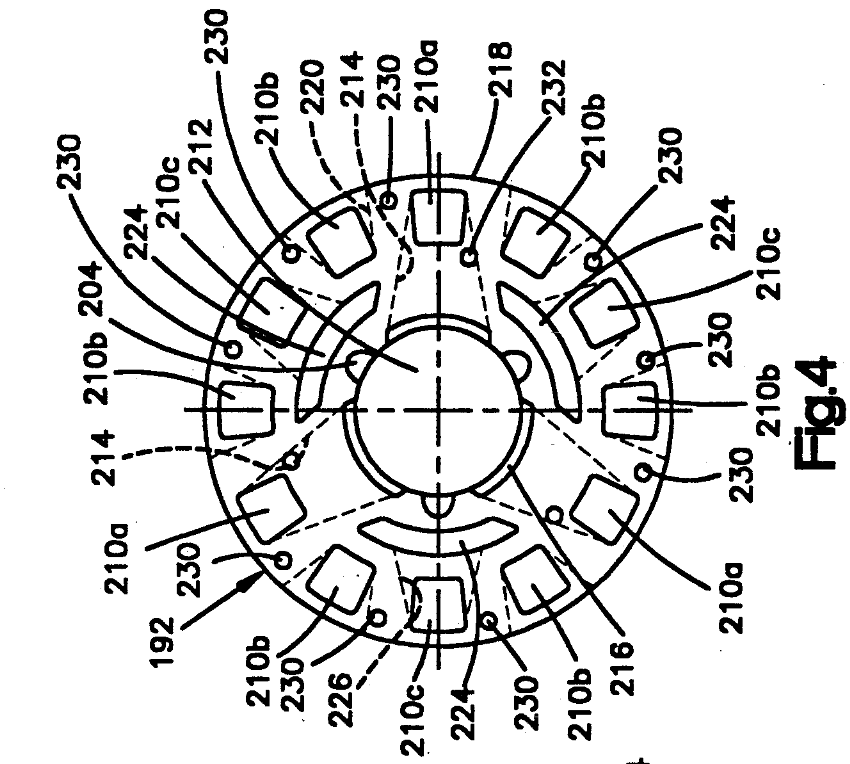
FIG. 4 is an elevational view of the commutator plate of the motor of FIG. 1, as viewed in the direction of line 4—4 of FIG. 2.

Twelve circumferentially spaced windows 210 extend axially through the commutator plate 192 (FIG. 4). Three of these windows, each designated 210*a* in FIG. 4, are in fluid communication with a central opening 212 in the plate 192 through radial passages 214 in the inner commutator plates 194 and arc-shaped openings 216 in the plate 192. The radial passages 214 are shown in dashed lines in the plate 192 in FIG. 4. Thus, the three windows 210*a* are each in fluid communication with and at the same pressure as the open center of the commutator plate 192.

A second group of six windows, each designated 210*b*, communicate with the outer circumference 218 of the plate 192 through radial passages 220 in the inner commutator plates 194. The radial passages 220 are shown in dashed lines in FIG. 4. The windows 210*b* are in fluid communication through the passages 220 with an annular space 222 (best seen in FIG. 2) on the inside of the commutator ring 54 radially outwardly of the commutator 184. The annular space 222 is in fluid communication with the bolt holes 146 in the outer manifold plate 122. Thus, the windows 210*b* are in fluid communication with the mounting bolt holes extending axially from the commutator ring 54 through the manifold 56, the stator 22, the wear plate 58, and to the housing body 42.

The three other windows in the plate 192, each designated 210*c*, communicate with arc-shaped openings 224 in the commutator plate 192 through radial passages 226 in the inner commutator plates 194. The radial passages 226 are shown in dashed lines in FIG. 4. The arc-shaped openings 224 are aligned with the ring-shaped opening 130 in the outer manifold plate 122.

Nine locator pin openings 230 extend through the commutator plate 192 near its outer circumference 218. The openings 230 receive locator pins (not shown) which hold the commutator plates 192 and 194 in position relative to each other during the brazing process. Three other openings 232 in the plate 192 are provided for pressure balancing purposes.

The control valve 40 (FIG. 7) is mounted in the manifold 56. Specifically, the control valve 40 is mounted in the five control plates 120. After the manifold 56 is assembled by brazing, as described above, a valve bore 238 (see FIG. 7) is drilled, reamed, and honed through the assembled stack of the five control plates 120. The bore 238 intersects the five fluid passages in each of the five control plates 120 which extend into the rectangular valve areas 152 of the plates 120. Specifically, the valve bore 238 intersects in each plate 120 the atmospheric pressure opening 180, the control passage 174, the common control passage 162, the control passage 156, and the pilot pressure opening 176.

A valve spool 240 is slidably received in the valve bore 238. The valve spool 240 may be made from SAE 1010–1020 low carbon steel heat treated. The valve spool 240 is movable in the valve bore 238 in a direction parallel to the plane of the control plates 120. The valve spool 240 is movable between a first position establishing fluid communication between the control passage 156 and the common control passage 162, and a second position establishing fluid communication between the control passage 174 and the common control passage 162. The first position of the valve spool 240 is illustrated in FIG. 7.

The valve spool 240 includes two cylindrical lands 242 and 244 interconnected by an axially extending neck portion 246. A portion 250 of the valve spool 240 interconnects the land 244 with a spring housing portion 252 of the valve spool 240. An elastomeric O-ring seal 254 encircles the portion 250 of the valve spool 240. A backup ring 256 encircles the spool portion 250 and is disposed between the O-ring seal 254 and the spring housing portion 252. There is a significant axial pressure differential across the O-ring seal 254. The backup ring 256 prevents the O-ring seal 254 from extruding axially as a result of this pressure differential.

Figure 7:
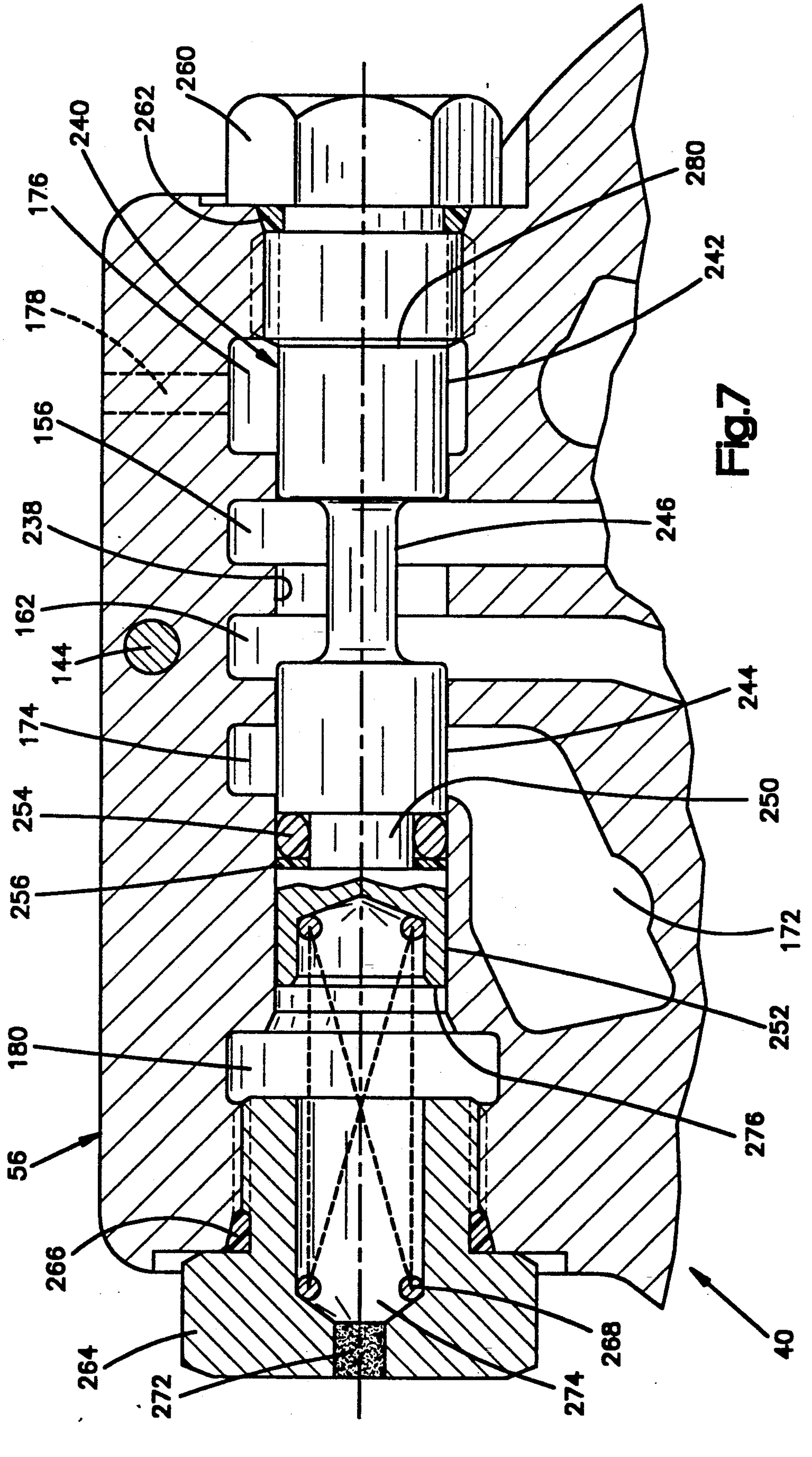
FIG. 7 is a transverse sectional view through the manifold and control valve of the motor of FIG. 1, taken along line 7—7 of FIG. 2.
Figure 8:
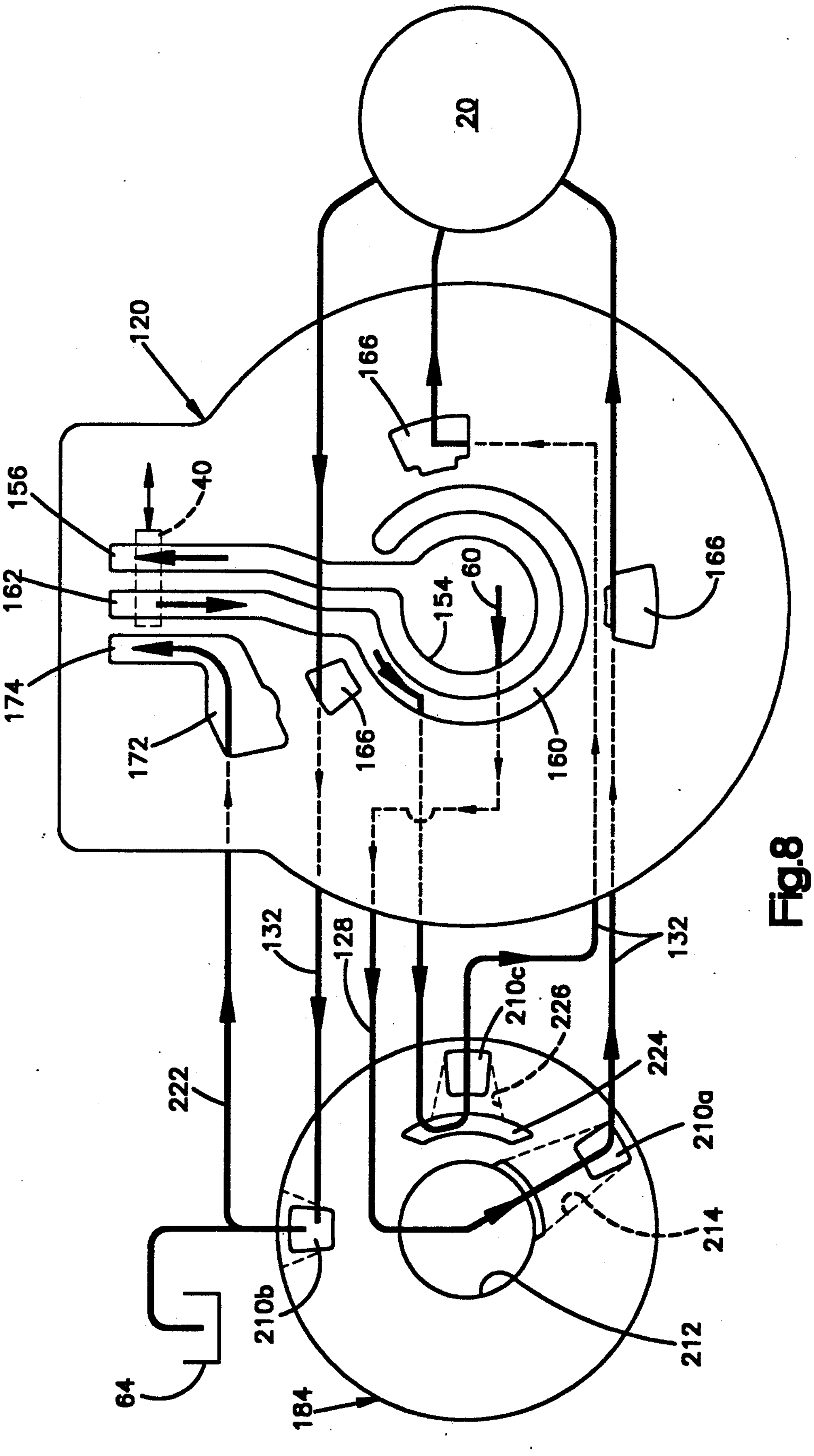
FIG. 8 is a schematic illustration of the flow of hydraulic fluid through the motor of FIG. 1.

One axial end of the bore 238, to the right as viewed in FIG. 7, is closed by a threaded plug 260 and an elastomeric seal 262. The opposite end of the bore 238 is closed by a threaded plug 264 and an elastomeric seal 266. A compression spring 268 extends between the threaded plug 264 and into the hollow spring portion 252 of the valve spool 240. The spring 268 biases the valve spool 240 into the position shown in FIG. 7. In this position, the valve 40 establishes fluid communication between the control passage 156 and the common control passage 162. The control passage 174 is blocked.

A powdered metal filter 272 is located in the threaded plug 264. The filter 272 allows air at atmospheric pressure to enter into and exit from the hollow interior 274 of the threaded plug 264. This air at atmospheric pressure is communicated to the atmospheric pressure opening 180 in the manifold 56 and thus to the axial end face 276 of the valve spool 240. As the valve spool 240 moves axially within the bore 238, air at atmospheric pressure can enter into and exit from the portion of the valve bore 238 which is to the left of the O-ring seal 254 (as viewed in FIG. 7).

In operation of the motor 10, high pressure fluid enters the motor 10 through the inlet port 60 (FIG. 1) and flows into the chamber 62 within the main housing body 42. High pressure fluid flows from the chamber 62 radially inwardly through the passage 84 in the output shaft 28, into the hollow end chamber 80 within the output shaft 28. Fluid flows from the chamber 80 radially inwardly through the passage 94 in the wobble shaft 26, into the central passage 92 which extends the length of the wobble shaft 26. Thus, high pressure fluid is present at the open end 96 of the wobble shaft 26.

High pressure fluid from the chamber 80 also flows through the open center 86 of the spacer plate, around the outside of the wobble shaft 26, and into the interior of the rotor 24. From the interior of the rotor 24, fluid flow axially through the central opening 208 in the drive link 200 to the interior of the commutator 184. Fluid also flows around the outside of the drive link 200 into the open center of the manifold 56. Accordingly, high pressure fluid is present in the interior of the commutator 184, and in the central openings 154 of the control plates 120.

High pressure fluid from the center 212 of the commutator plate 192 (FIG. 4) flows radially outwardly through the radial passages 214 into the windows **210*a*. As the commutator 184 rotates and the plate 192 commutates against the manifold 56, the high pressure fluid in the windows 210*a* flows axially through the manifold 56 into the gear set 20. In passing through the manifold 56, the fluid flows from the windows 210*a* through windows 132 in the outer manifold plate 122, windows 166 in the control plates 120, and windows in the manifold plates 126 and 128, into expanding pockets 116 within the gear set 20**.

In a known manner, the high pressure fluid drives the rotor 24 to rotate and orbit, and certain pockets 116 contract as other pockets 116 expand. Fluid is forced out of the contracting pockets 116. This fluid, which is now at a lower pressure, flows axially back through the manifold 56 to the commutator 184. Specifically, the low pressure fluid exits the pockets 116 through windows in the outer manifold plates 128 and 126, through windows 166 in the control plates 120, and through windows 132 in the outer manifold plate 122 The low-pressure fluid is then received in windows **210*b* in the rotating commutator plate 192**.

The low-pressure fluid received in the windows **210*b* flows radially outwardly through the passages 220 in the inner commutator plates 194 into the annular space 222 between the outer circumference 218 of the commutator 184 and the commutator ring 54. This annular space 222 is in fluid communication with the bolt holes extending through the manifold 56. The low pressure fluid flows through the bolt holes 146 in the outer manifold plates and the bolt holes 172 in the control plates 120. Fluid then passes through the adjoining bolt holes 110 in the stator 22, the bolt holes 88 in the spacer 58, and into the annular groove 66 in the housing body 42. The groove 66 is in fluid communication with the outlet port 64, and the low pressure fluid is exhausted from the motor through the outlet port 64**.

When the motor 10 is in a low speed, high torque mode, the spring 268 (FIG. 7) biases the valve spool 240 into the position shown in FIG. 7. The control passage 156 is in fluid communication with the common control passage 162 across the neck portion 246 of the valve spool 240. Accordingly, fluid can flow between the control passage 156 and the common control passage 162 in the control plate 120.

Thus, when the motor 109 is in a low speed, high torque mode, high pressure fluid which is present at the open center 154 of the control plate 120 flows radially outwardly through the control passage 156 into the valve 40. The high pressure fluid flows axially along the neck portion 246 of the valve 40 and into the common control passage 162. The fluid then flows radially inwardly through the common control passage 162 into the circular portion 160 of the question mark-shaped passage 164.

The circular portion 160 is in fluid communication with the ring opening 130 in the outer manifold plate 124 The ring opening 130 is in fluid communication with the three arc-shaped openings 224 in the commutator plate (FIG. 4). High pressure fluid thus flows from the circular portion 160 in the control plate 120, through the ring portion 130 in the outer manifold plate 124, and into the arc-shaped openings 224 in the commutator plate 192.

This high pressure fluid then flows radially outwardly through the passages 226 in the inner commutator plates 194 and into the three common windows 210*c* in the outer commutator plates 192. As the commutator 184 rotates and the outer commutator plate 192 commutates against the outer manifold plate 122, high pressure fluid flows axially from the windows 210*c* into windows 132 in the outer manifold plate 122. From here, the high pressure fluid travels axially through the manifold 56 into the gear set 20, in the manner described above with reference to the high pressure fluid flowing axially from the commutator windows 210*a*. The high pressure fluid from the windows 210*c* passes through the gear set 20 and at a low pressure is exhausted from the gear set 20 to the outlet port 64, in the same manner as described above.

The motor 10 is switched into a high speed, low torque mode when fluid under sufficient pressure is supplied through the pilot passage 178 (FIG. 7) into the pilot pressure opening 176 in the control valve 40. The pilot fluid can be supplied from any suitable fluid source. The switching can be initiated in any suitable manner, for example manually or automatically in response to a sensed condition, depending on the application in which the motor 10 is used.

The pilot fluid in the opening 176 bears against the axial end face 280 of the land 242 of the valve spool 240, causing the valve spool 240 to shift axially to the left as viewed in FIG. 7 against the bias of the spring 268. The land 242 covers and blocks the control passage 156. The land 244, as it moves axially, opens the control passage 174 into fluid communication with the common control passage 162. Fluid is thus able to flow between the control passage 174 and the common control passage 162 in the control plate 120.

The control passage 174 is in fluid communication with a bolt hole 172 in the control plate 120. Low pressure fluid is present in the bolt hole 172. At least a portion of the low pressure fluid in the bolt hole 172, which portion would otherwise be exhausted from the motor 10 through the outlet port 64, instead flows radially outwardly through the control passage 174 into the valve bore 238. This low pressure fluid then flows axially along the neck portion 246 of the control valve 40 into the common control passage 162. The fluid then flows radially inwardly through the common control passage 162 into the ring-shaped opening 160 of the control plate 120.

Then, following the same flow path as described above with reference to high pressure fluid, the low pressure fluid which is present in the opening 160 in the control plate 120 flows through the opening 130 in the outer manifold plate 122 and into the arc-shaped openings 224 in the commutator 184. The low pressure fluid then flows outwardly into the windows 210*c* in the commutator 184. The low-pressure fluid then flows axially through the manifold 56 into expanding pockets 116 in the gear set 20. When an expanding pocket 116 is switched to a contracting pocket, the fluid exits the gear set 20 axially through the manifold 56 into the six windows 210*b* in the commutator 184. From the windows 210*b*, the low pressure fluid flows radially outwardly into the bolt holes of the motor 10 and can be exhausted through the exhaust port 64.

Thus, it can be seen that when the motor is in its low speed, high torque mode, high pressure fluid is directed to the gear set 20 from the six windows 210*a* and 210*c* in the commutator 184, while low pressure fluid is exhausted from the gear set 20 through the six windows 210*b* in the commutator 184. On the other hand, when the motor is in its high speed, low torque mode, high pressure fluid is directed to the gear set 20 only through the three windows 210*a* in the commutator 184. Low pressure fluid recirculated from the bolt holes 172 is directed to expanding pockets in the gear set 20 through the three windows 210*c* in the commutator 184. All of the fluid leaving the gear set 20 is exhausted through the six windows 210*b* in the commutator 184. The motor 10 thus may be switched between a first condition in which the output shaft 28 rotates at a relatively low speed with a relatively high torque, and a second condition in which the output shaft 28 rotates at about twice the speed but with about one half the torque.

It should be noted that the direction of rotation of the motor 109 is reversed when high pressure fluid is supplied into the port 64 instead of the port 60.

Figure 9:
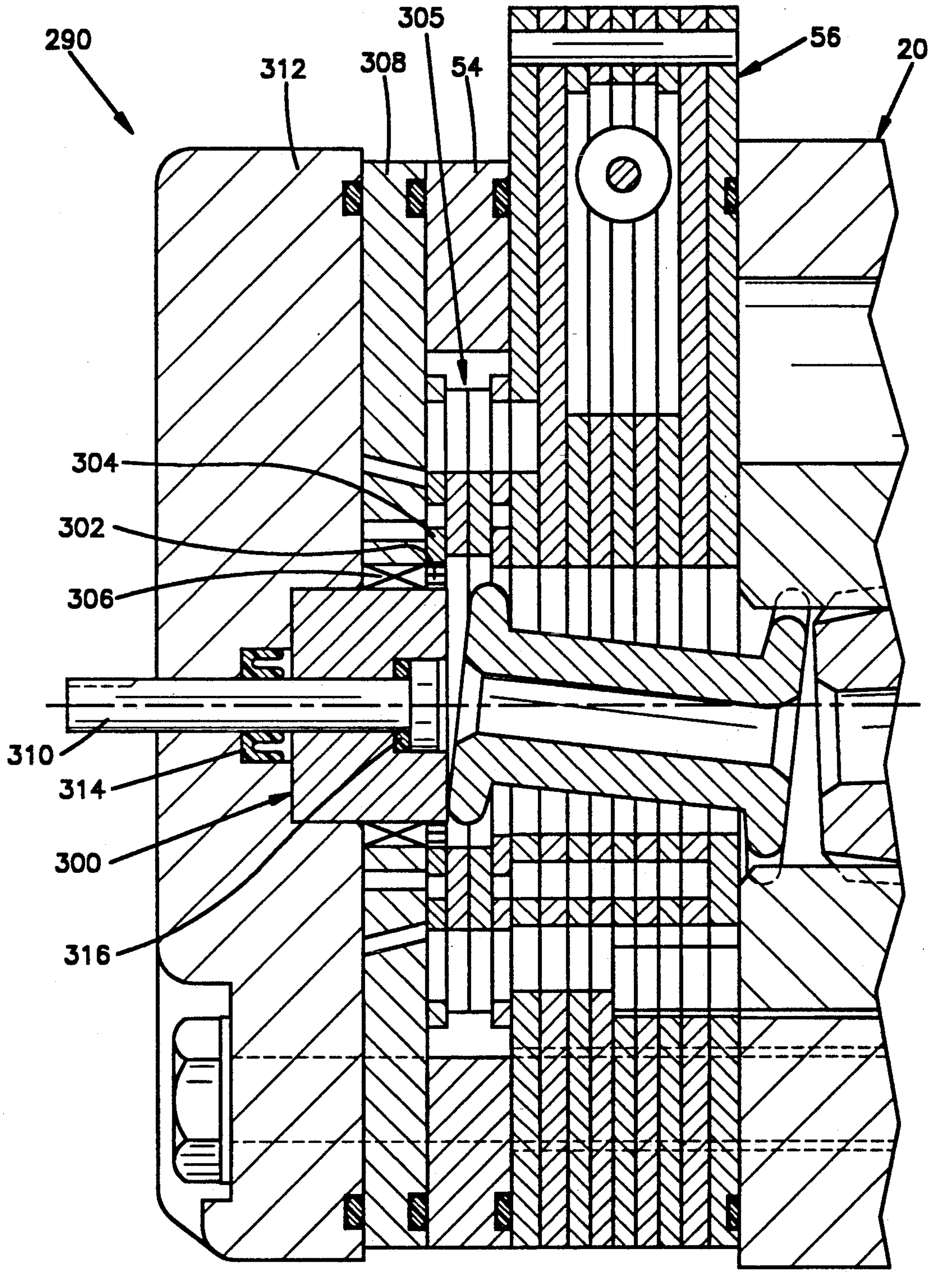
FIG. 9 is a view similar to FIG. 2 illustrating a second embodiment of the invention.

In a second embodiment of the invention, a fluid motor according to the present invention includes a rotating shaft which projects from the end of the motor opposite the output shaft and which rotates with the same rotational speed as the output shaft. This second embodiment of the invention is illustrated in FIG. 9 which shows a portion of a fluid motor 10 (FIG. 1–8) in all respects other than those described hereinafter.

In the motor 290 (FIG. 9), a drive link spacer 300, instead of being fixed in the motor housing, has a splined connection at 302 to the inner circumference of the commutator plate 304. The drive link spacer 300 thus rotates with the commutator 305. The drive link spacer 300 rotates in a bearing 306 in the pressure balance plate 308.

A shaft 310 is fixed by any suitable means for rotation with the drive link spacer 300. The shaft 310 thus rotates at the same speed as the drive link spacer 300 and the commutator 305. The shaft 310 projects axially outwardly from the drive link spacer 300 through the motor end cap 312 and out the end of the motor housing. A seal 314 blocks fluid flow between the shaft 310 and the end cap 312, and a seal 316 blocks fluid flow between the shaft 310 and the drive link spacer 300.

Since the shaft 310 rotates at the same speed as the commutator 305, and the commutator 305 rotates at the same speed as the output shaft (not shown in FIG. 9), the shaft 310 therefore rotates at the same speed as the output shaft. Accordingly, this embodiment of the invention provides a shaft projecting from the end of the motor opposite the output shaft, which rotates with the same rotational speed as the output shaft. This rotating shaft can be used, for example, to drive an encoder.

From the above description of the invention, those skilled in the art perceive improvements, changes and modifications in the invention. Such improvements, changes and modifications within the skill of the art are intended to be covered by the appended claims.

I claim:

1. An apparatus comprising:

a plurality of flat plates having major surfaces lying parallel to each other and stacked together in sealing engagement, a major surface of a first one of said plates defining one axial side of a valve chamber, a major surface of a second one of said plates defining the opposite axial side of said valve chamber;

a plurality of said plates being intermediate plates located between said first and second ones of said plates, said intermediate plates having aligned openings and edge portions defining said aligned openings extending transverse to the major surfaces thereof, said aligned openings forming said valve chamber and said edge portions of said intermediate plates comprising a boundary of said valve chamber;

said edge portions of a plurality of adjacent intermediate plates defining fluid ports communicating with said valve chamber and with a plurality of fluid passages extending through said plates parallel to said major surfaces; and a control valve member disposed in said valve chamber and movable in said valve chamber to control fluid flow through said plurality of fluid passages, said control valve member being movable in a direction parallel to said major surfaces.

2. An apparatus as defined in claim 1 wherein said plurality of plates include surface means defining a first control passage extending across at least two plates in said plurality of plates and connecting a first fluid port and said valve chamber, a second control passage extending across at least two plates in said plurality of plates and connecting at second fluid port and said valve chamber, and a third control passage extending across at least two plates in said plurality of plates and for connecting said valve chamber and a fluid displacement means.

3. An apparatus as defined in claim 2 wherein said control valve member is shiftable in said valve chamber between a first position establishing fluid communication between said first control passage and said third control passage, and a second position establishing fluid communication between said second control passage and said third control passage.

4. An apparatus comprising:

a housing having an inlet port for receiving high pressure fluid and an exhaust port for exhausting low pressure fluid;

an output shaft supported for rotation relative to said housing about a longitudinal central axis;

fluid displacement means in said housing for rotating said output shaft in response to fluid pressure being applied to said fluid displacement means;

a plurality of adjoining planar plates stacked together, each of said plates having a pair of major side surfaces extending transverse to the longitudinal central axis of said output shaft, a major side surface of each plate lying in contact with a major side surface of its adjoining plate to provide sealing engagement therebetween;

means for securing said planar plates to said housing axially adjacent said fluid displacement means;

said plates defining a valve chamber, said valve chamber having a longitudinal central axis extending transverse to the longitudinal central axis of said output shaft, said valve chamber extending across at least two of said plates in the direction of the extent of the longitudinal central axis of said output shaft;

said plates defining fluid passages for conducting fluid from said inlet port to said fluid displacement means and from said fluid displacement means to said exhaust port, said fluid passages communicating with said valve chamber and extending transverse to the longitudinal axis of said output shaft, adjoining portions of openings in adjoining plates registering to form said fluid passages; and a control valve member disposed in said valve chamber and movable in said valve chamber to control fluid flow through said fluid passages, said control valve member being movable in said valve chamber in a direction transverse to the longitudinal central axis of said output shaft.

5. An apparatus as defined in claim 4 wherein said fluid displacement means comprises relatively rotatable and orbital gerotor gears, said gerotor gears having intermeshing teeth which define fluid chambers that expand and contract as said gerotor gears rotate and orbit relative to each other in response to fluid being supplied to said fluid displacement means.

6. An apparatus as defined in claim 4 wherein said plurality of plates include surface means defining a first control passage extending across at least two plates in said plurality of plates and connecting said inlet port and said valve chamber, a second control passage extending across at least two plates in said plurality of plates and connecting said exhaust port and said valve chamber, and a third control passage extending across at least two plates in said plurality of plates and for connecting said valve chamber and said fluid displacement means.

7. An apparatus as defined in claim 6 wherein said control valve member is shiftable in said valve chamber between a first position establishing fluid communication between said first control passage and said third control passage, and a second position establishing fluid communication between said second control passage and said third control passage.

8. An apparatus as defined in claim 7 wherein said control valve member is biased into one of said first and second positions.

9. An apparatus as defined in claim 7 wherein said plurality of plates include surface means defining a pilot fluid passage through which a pilot fluid flows into said valve chamber to shift said control valve member.

10. An apparatus as defined in claim 6 further comprising commutation valve means for controlling fluid flow from said inlet port and from said valve chamber to said fluid displacement means.

11. An apparatus as defined in claim 10 further comprising a driven shaft supported for rotation relative to said housing and projecting from an axial end of said housing opposite from said output shaft, said driven shaft being driven for rotation by said commutation valve means.

12. An apparatus as defined in claim 10 wherein said commutation valve means includes first opening means for establishing fluid communication between said inlet port and said fluid displacement means, second opening means for establishing fluid communication between said third control passage in said plurality of plates and said fluid displacement means.

13. An apparatus as defined in claim 12 wherein said third opening means is selectively connected to either said inlet port or said exhaust port through said third control passage.

14. An apparatus as defined in claim 6 wherein said plurality of plates include surface means defining a center chamber in fluid communication with said inlet port, said valve chamber being disposed radially outwardly of said center chamber in said plurality of plates, said first control passage extending radially in said plurality of plates between said center chamber and said valve chamber.

15. An apparatus as defined in claim 4 wherein said plurality of plates are fixed together in sealing engagement by brazing.

16. An apparatus as defined in claim 4 wherein a major surface of a first one of said plates defines one axial side of said valve chamber and a major surface of a second one of said plates defines the opposite axial side of said valve chamber.

17. An apparatus as defined in claim 16 wherein a plurality of said plurality of plates are intermediate plates located between said first and second ones of said plates, said intermediate plates having aligned openings and edge portions defining said aligned openings extending transverse to the major surfaces thereof, said aligned openings forming said valve chamber and said edge portions of said intermediate plates comprising a boundary of said valve chamber.

18. An apparatus as defined in claim 17 wherein said edge portions of a plurality of adjacent intermediate plates define said inlet and exhaust ports communicating with said valve chamber and with said fluid passages.

* * * * *

UNITED STATES PATENT AND TRADEMARK OFFICE

CERTIFICATE OF CORRECTION

PATENT NO. : 5,137,438

DATED : August 11, 1992

INVENTOR(S) : Laurence L. Miller

It is certified that error appears in the above-identified patent and that said Letters Patent is hereby corrected as shown below:

Column 12, Line 51, Claim 12, after "said" (first occurrence) insert --exhaust port and said fluid displacement means, and third opening means for establishing fluid communication between said--.

Signed and Sealed this

Seventh Day of September, 1993

Attest:

Bruce Lehman

BRUCE LEHMAN

*Attesting Officer*

*Commissioner of Patents and Trademarks*